United States Patent
Honma et al.

(10) Patent No.: US 6,917,743 B2
(45) Date of Patent: Jul. 12, 2005

(54) OPTICAL FIBER, OPTICAL TRANSMISSION LINE, AND OPTICAL COMMUNICATIONS SYSTEM

(75) Inventors: Noritaka Honma, Yokohama (JP); Takatoshi Kato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 161 days.

(21) Appl. No.: 10/620,434

(22) Filed: Jul. 17, 2003

(65) Prior Publication Data

US 2004/0017988 A1 Jan. 29, 2004

(30) Foreign Application Priority Data

Jul. 26, 2002 (JP) .................................. 2002-218449

(51) Int. Cl.[7] .................................................. G02B 6/02
(52) U.S. Cl. ........................ 385/127; 385/24; 385/123
(58) Field of Search ............................. 385/24, 122–128

(56) References Cited

U.S. PATENT DOCUMENTS

| | | | |
|---|---|---|---|
| 5,361,319 A | | 11/1994 | Antos et al. |
| 5,838,867 A | * | 11/1998 | Onishi et al. ............ 385/123 |
| 2002/0164138 A1 | | 11/2002 | Saitou et al. |
| 2002/0164139 A1 | | 11/2002 | Saitou et al. |
| 2003/0021563 A1 | | 1/2003 | Jiang et al. |

FOREIGN PATENT DOCUMENTS

JP    06-11620    1/1994

OTHER PUBLICATIONS

S. bigo et al., ECOC'99, 25th European Conference on Optical Communication, Sep. 26–30, 1999 Nice, France, 4 pages.

ECOC'98, 24th European Conference on Optical Communication, Sep. 20–24, 1998 Madrid, Spain—cover sheet, p. 6, pp. 139–140.

* cited by examiner

Primary Examiner—Phan T. H. Palmer
(74) Attorney, Agent, or Firm—McDermott Will & Emery LLP

(57) ABSTRACT

An optical fiber capable of compensating in the L-band both the chromatic dispersion and dispersion slope of a positive-dispersion optical fiber, an optical transmission line incorporating the optical fiber, and an optical communications system incorporating the optical transmission line. An optical communications system 1 comprises an optical transmission line 10, an optical transmitter 20, and an optical receiver 30. The optical transmission line 10 comprises an optical fiber 11 and an optical fiber 12 that are mutually fusion-spliced. The optical fiber 12 has at a wavelength of 1,590 nm a chromatic dispersion, $D_2$, and a dispersion slope, $S_2$, that satisfy the formulae $-200\ \text{ps/nm/km} \leq D_2 \leq -50\ \text{ps/nm/km}$, and $0.009/\text{nm} \leq S_2/D_2$.

14 Claims, 7 Drawing Sheets

OPTICAL FIBER, OPTICAL TRANSMISSION LINE, AND OPTICAL COMMUNICATIONS SYSTEM

BACKGROUND OF THE INVENTION

1. Field of the Invention

The present invention relates to an optical fiber capable of compensating both the chromatic dispersion and dispersion slope of a positive-dispersion optical fiber, an optical transmission line constructed by splicing the optical fiber and a positive-dispersion optical fiber, and an optical communications system incorporating the optical transmission line.

2. Description of the Background Art

The wavelength division multiplexing (WDM) optical communications system multiplexes a plurality of component signals having mutually different wavelengths with an optical transmitter to transmit them. A signal lightwave composed of the component signals travels over an optical transmission line to arrive at an optical receiver. The WDM communications system can transmit and receive a large volume of information at a high rate. The conventional WDM communications system uses the C-band (1,530 to 1,565 nm) as a wavelength band for signal lightwaves. To increase the transmission capacity further, the use of the L-band (1,565 to 1,625 nm) is also being studied as the wavelength band for signal lightwaves.

It is desirable that the optical transmission line for the WDM communications system have a small absolute value of the chromatic dispersion over the entire wavelength band of the signal lightwave in order to transmit the signal lightwave with high quality. However, it is difficult to reduce the absolute value of the chromatic dispersion over the entire wavelength band of the signal lightwave when the optical transmission line is constructed by using only one type of optical fiber. Consequently, an optical transmission line is usually constructed by using two types of optical fibers to reduce the absolute value of the average chromatic dispersion of the entire optical transmission line over the wavelength band of the signal lightwave.

For example, published Japanese patent application H6-11620 has disclosed an optical transmission line for the application where the C-band is used as the wavelength band of the signal lightwave. The optical transmission line is constructed by splicing a standard single-mode optical fiber and a dispersion-compensating optical fiber. Here, the single-mode optical fiber is a positive-dispersion optical fiber having a zero dispersion wavelength at a wavelength of 1.3 μm or so, and a positive chromatic dispersion of 15 ps/nm/km or so and a positive dispersion slope of 0.06 ps/nm²/km or so at a wavelength of 1.55 μm. The dispersion-compensating optical fiber has a negative chromatic dispersion and a negative dispersion slope at a wavelength of 1.55 μm, and compensates both the chromatic dispersion and dispersion slope of the single-mode optical fiber.

U.S. Pat. No. 5,838,867 has disclosed another optical transmission line. The optical transmission line is constructed by splicing a non-zero dispersion-shifted fiber and a dispersion-compensating optical fiber. Here, the non-zero dispersion-shifted fiber is a positive-dispersion optical fiber having a zero-dispersion wavelength shifted to a wavelength of more than 1.3 μm, and a positive chromatic dispersion between 1 and 10 ps/nm/km and a positive dispersion slope at a wavelength of 1.55 μm. The dispersion-compensating optical fiber has a negative chromatic dispersion and a negative dispersion slope at a wavelength of 1.55 μm, and compensates both the chromatic dispersion and dispersion slope of the dispersion-shifted optical fiber.

The foregoing optical transmission lines constructed by splicing a positive-dispersion optical fiber (a single-mode optical fiber or a non-zero dispersion-shifted fiber) and a dispersion-compensating optical fiber has a small absolute value of the chromatic dispersion over the entire C-band and can perform high-quality WDM optical communication. However, the absolute value of the chromatic dispersion is not sufficiently small in the L-band. Therefore, they are not suitable for performing WDM optical communication in the L-band.

S. Bigo, et al. have reported in ECOC'99, PD 2–9 (p. 40) a non-zero dispersion-shifted fiber having a chromatic dispersion of 8 ps/nm/km and a dispersion slope of 0.057 ps/nm²/km at a wavelength of 1,550 nm (a chromatic dispersion of 10.3 ps/nm/km and a dispersion slope of 0.06 ps/nm²/km at a wavelength of 1,590 nm). D. W. Peckham, et al. have reported in ECOC'98 (p. 139) a non-zero dispersion-shifted fiber having a chromatic dispersion of 3.7 ps/nm/km and a dispersion slope of 0.0457 ps/nm²/km at a wavelength of 1,550 nm (a chromatic dispersion of 5.5 ps/nm/km and a dispersion slope of 0.046 ps/nm²/km at a wavelength of 1,590 nm). Published international application WO 00/65387 has disclosed a non-zero dispersion-shifted fiber having a chromatic dispersion of +7.7 ps/nm/km and a dispersion slope of +0.08 ps/nm²/km at a wavelength of 1,590 nm. However, no report has so far been published on a dispersion-compensating optical fiber capable of compensating in the L-band both the chromatic dispersion and dispersion slope of the above-described non-zero dispersion-shifted fibers.

SUMMARY OF THE INVENTION

An object of the present invention is to offer an optical fiber capable of compensating in the L-band both the chromatic dispersion and dispersion slope of a non-zero dispersion-shifted fiber. Another object is to offer an optical transmission line constructed by splicing the optical fiber and a non-zero dispersion-shifted fiber for performing high-quality WDM optical communication in the L-band. Yet another object is to offer an optical communications system incorporating the optical transmission line.

According to the present invention, the foregoing object is attained by offering an optical fiber having at a wavelength of 1,590 nm a chromatic dispersion, D, and a dispersion slope, S, that satisfy the formulae $-200 \text{ ps/nm/km} \leq D \leq -50 \text{ ps/nm/km}$, and $0.009/\text{nm} \leq S/D$.

The optical fiber may comprise the following regions:

(a) a central core region including the center of optical axis and having a first refractive index;

(b) a first cladding region encircling the central core region and having a second refractive index smaller than the first refractive index;

(c) a second cladding region encircling the first cladding region and having a third refractive index larger than the second refractive index; and (d) a third cladding region encircling the second cladding region and having a fourth refractive index smaller than the third refractive index.

In accordance with another aspect of the present invention, an optical transmission line is offered that comprises the following components:

(a) a positive-dispersion optical fiber having at a wavelength of 1,590 nm a chromatic dispersion of +6 to +10 ps/nm/km and a dispersion slope of +0.07 to +0.10 ps/nm²/km; and (b) the optical fiber of the present invention that is spliced with the positive-dispersion optical fiber.

In accordance with yet another aspect of the present invention, an optical communications system is offered that comprises the following components:

(a) an optical transmitter for multiplexing a plurality of component signals having mutually different wavelengths to constitute a signal lightwave so that the signal lightwave can be outputted;

(b) the optical transmission line of the present invention that transmits the signal lightwave outputted from the optical transmitter; and (c) an optical receiver for receiving the signal lightwave having traveled over the optical transmission line.

Advantages of the present invention will become apparent from the following detailed description, which illustrates the best mode contemplated to carry out the invention. The invention can also be carried out by different embodiments, and its several details can be modified in various respects, all without departing from the invention. Accordingly, the accompanying drawing and the following description are illustrative in nature, not restrictive.

BRIEF DESCRIPTION OF THE DRAWING

The present invention is illustrated to show examples, not to show limitations, in the figures of the accompanying drawing. In the drawing, the same reference numeral and sign refer to a similar element.

In the drawing.

DETAILED DESCRIPTION OF THE INVENTION

Figure 1:
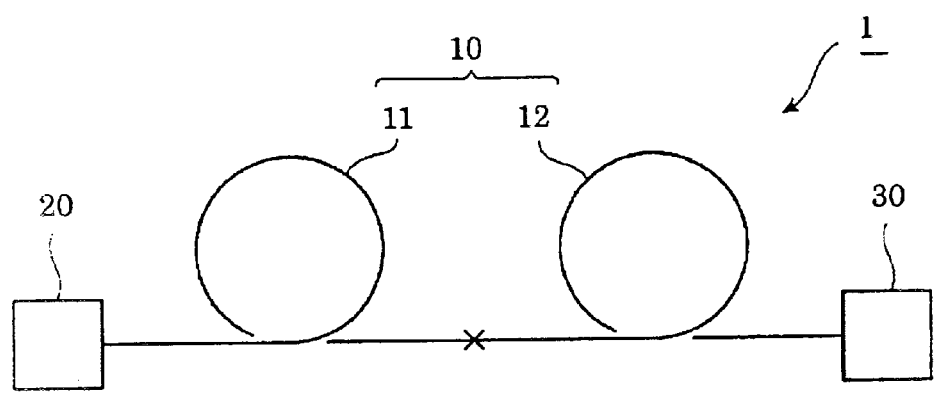
FIG. 1 is a diagram showing the constitution of an optical communications system 1 and an optical transmission line 10 in the embodiment of the present invention.

FIG. 1 is a diagram showing the constitution of an optical communications system 1 and an optical transmission line 10 in the embodiment of the present invention. The optical communications system 1 comprises an optical transmission line 10, an optical transmitter 20, and an optical receiver 30. The optical transmitter 20 multiplexes a plurality of component signals having mutually different wavelengths to output them. A wavelength-multiplexed signal lightwave travels over the optical transmission line 10. The optical receiver 30 receives the signal lightwave. The optical transmission line 10 comprises an optical fiber 11 and an optical fiber 12 that are mutually fusion-spliced. The signal lightwave travels over the optical fibers 11 and 12 in this order.

Figure 2:
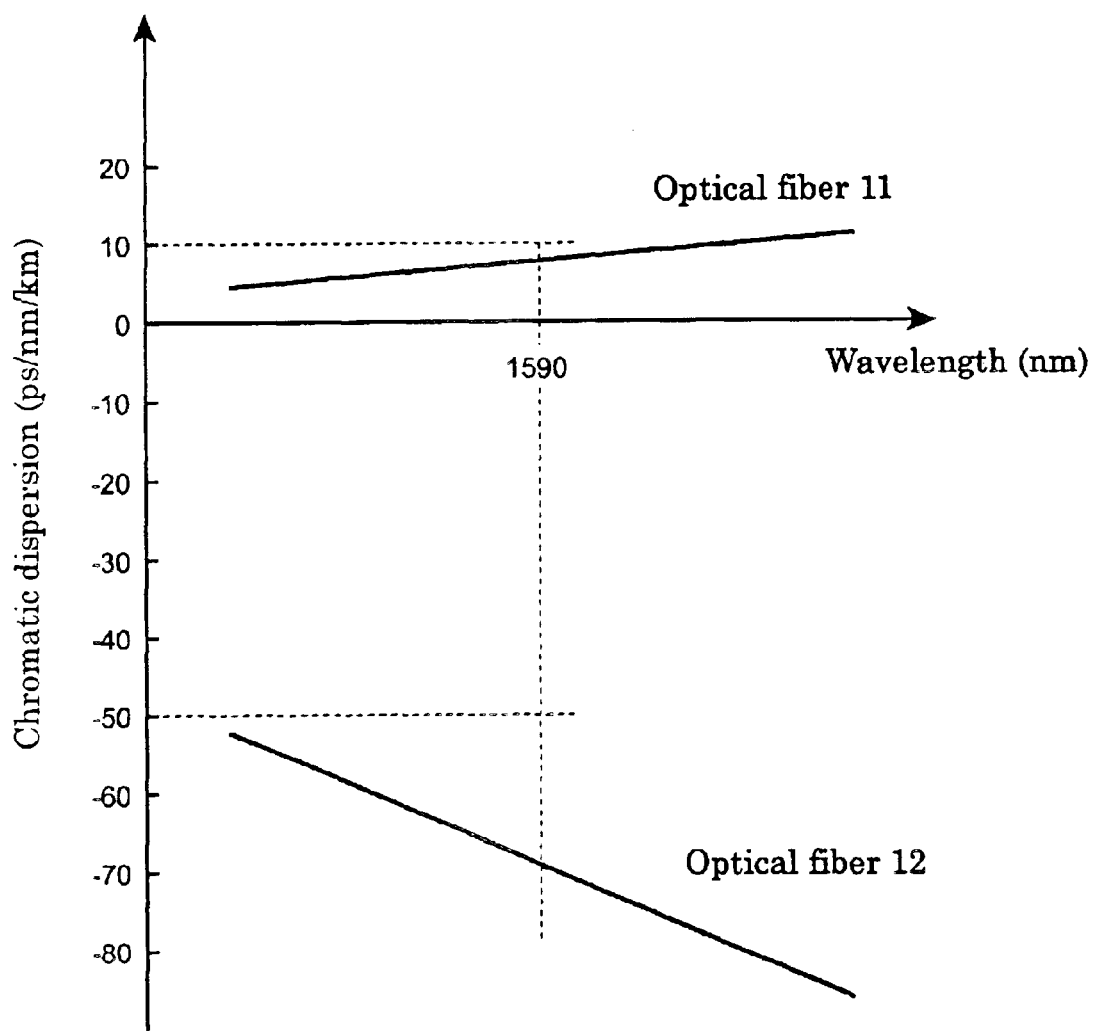
FIG. 2 is a graph showing the chromatic dispersion-wavelength properties of the optical fibers 11 and 12 incorporated into the optical transmission line 10.

FIG. 2 is a graph showing the chromatic dispersion-wavelength properties of the optical fibers 11 and 12. The optical fiber 11 has a positive chromatic dispersion and a positive dispersion slope at a wavelength of 1,590 nm. The optical fiber 12 has a negative chromatic dispersion and a negative dispersion slope at a wavelength of 1,590 nm. It is desirable that the optical fiber 11 have a chromatic dispersion, $D_1$, of +6 to +10 ps/nm/km and a dispersion slope, $S_1$, of +0.07 to +0.10 ps/nm²/km at a wavelength of 1,590 nm. The optical fiber 12 is required to have at a wavelength of 1,590 nm a chromatic dispersion, $D_2$, and a dispersion slope, $S_2$, that satisfy the following formulae.

$$-200 \text{ ps/nm/km} \leq D_2 \leq -50 \text{ ps/nm/km} \tag{1a}$$

$$0.009/\text{nm} \leq S_2/D_2 \tag{1b}$$

The chromatic dispersion $D_2$ may have a lower limit of −110 ps/nm/km. The ratio $S_2/D_2$ may have an upper limit of 0.015/nm. The upper limit may be reduced to 0.011/nm.

In the optical transmission line 10 and the optical communications system 1 incorporating it, both the chromatic dispersion and dispersion slope of the optical fiber 11 in the L-band are compensated by the optical fiber 12. Consequently, a signal lightwave having a multitude of wavelengths in the L-band can be transmitted with high quality. It is desirable that the optical transmission line 10 have a variation range of at most 0.4 ps/nm/km in the average chromatic dispersion of the entire optical transmission line in a wavelength range of 1,570 to 1,610 nm. Here, the term "variation range" is used to mean the difference between the maximum value and the minimum value. In this optical transmission line, the ratio of the length of the positive-dispersion optical fiber to that of the optical fiber of the present invention is properly determined. As a result, the absolute value of the chromatic dispersion in the L-band is considerably reduced, which enables the high-quality WDM optical communication.

It is desirable that the optical fiber 12 have an effective core area (hereinafter referred to as "effective area") of at least 12 μm² at a wavelength of 1,590 nm. In this case, the generation of non-linear optical phenomena can be suppressed, which can further increase the quality of the optical communication. It is desirable that the optical fiber 12 have a cutoff wavelength of at least 1.2 μm. In this case, even when the optical fiber is bent in a coil to form a module, the increase in bend loss can be suppressed. It is desirable that the optical fiber 12 have a transmission loss of at most 1.0 dB/km at a wavelength of 1,590 nm. It is desirable that the optical fiber 12 have a total loss of at most 7 dB in a wavelength range of 1,565 to 1,610 nm. In these two cases, the loss of a signal lightwave can be substantially reduced, which enables the long-distance transmission.

Figure 3A:
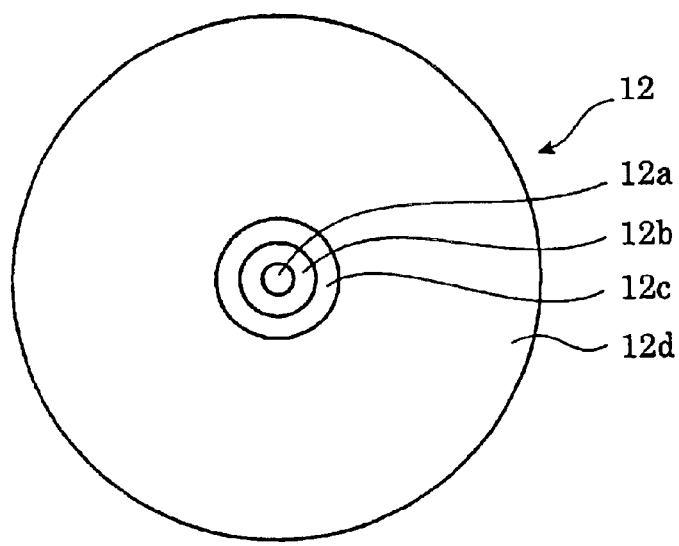
FIG. 3A shows a cross section of the optical fiber 12.
Figure 3B:
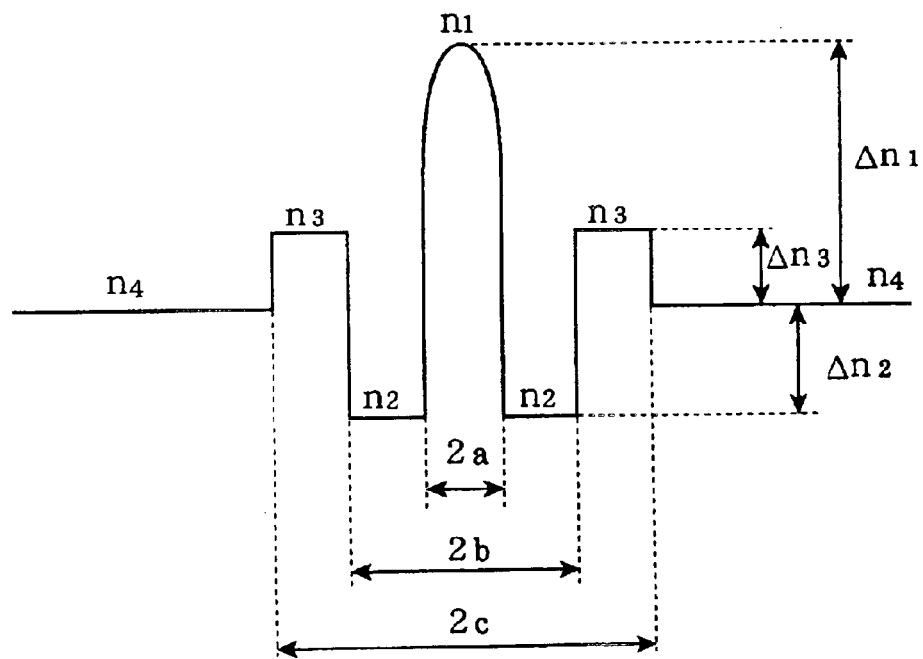
FIG. 3B is a diagram showing the refractive-index profile of the optical fiber 12.

FIG. 3A shows a cross section of the optical fiber 12. FIG. 3B is a diagram showing the refractive-index profile of the optical fiber 12. The optical fiber 12 has from the center of optical axis a central core region 12a (maximum refractive index: $n_1$, diameter: 2a), a first cladding region 12b (refractive index: $n_2$, outer diameter: 2b), a second cladding region 12c (refractive index: $n_3$, outer diameter: 2c), and a third cladding region 12d (refractive index: $n_4$). The refractive indexes of the regions have a relationship of $n_1 > n_3 > n_4 > n_2$. The relative refractive-index difference, $\Delta n_i$, of an individual region is defined as $(n_i - n_4)/n_4$ by using the refractive index $n_4$ of the third cladding region as the reference.

The optical fiber 12 can be produced by the following method:

(a) silica glass is used as the host material;

(b) the central core region 12a and the second cladding region 12c are doped with a proper amount of germanium oxide; and (c) the first cladding region 12b is doped with a proper amount of fluorine. Having the foregoing refractive-index profile, the optical fiber 12 can readily acquire a chromatic dispersion and a dispersion slope that satisfy formulae (1a) and (1b).

It is desirable that the optical fiber 12 have a structure such that (a) the central core region 12a has a relative refractive-index difference, $\Delta n_1$, of at least 1.2% and (b) the first cladding region 12b has a relative refractive-index difference, $\Delta n_2$, of at most −0.3%. It is desirable that the ratio 2a/2c be at least 0.20, where 2a is the diameter of the central core region 12a, and 2c is the outer diameter of the second cladding region 12c. Furthermore, it is desirable that when the outer diameter 2c of the second cladding region 12c varies by 2%, the ratio $S_2/D_2$ vary by at most 15%. This condition facilitates the production of the optical fiber 12.

Examples of the optical fiber 12 are explained below. Table I shows dimensions and properties of Examples 1 to 10 of the optical fiber of the present invention. The optical fibers of Examples 1 to 10 have the refractive-index profile shown in FIG. 3B. The effective area (denoted as $A_{eff}$ in Table I), bend loss, and transmission loss (denoted as Loss in Table I) are the values at a wavelength of 1,590 nm. The bend loss shows an increment in loss when the optical fiber is bent on a mandrel having a diameter of 20 mm.

ratio $S_2/D_2$ of the optical fibers of Examples 1 to 8 varied by ±2.5%, ±11.5%, ±9.0%, ±10.0%, ±50%, ±25%, ±50%, ±202%, respectively. As shown above, in the optical fibers of Examples 1 to 4, when the outer diameter 2c varied by 2%, the variation of the ratio $S_2/D_2$ was less than 15%. This means that these optical fibers can be readily produced with the intended chromatic dispersion-wavelength property.

Figure 5A:
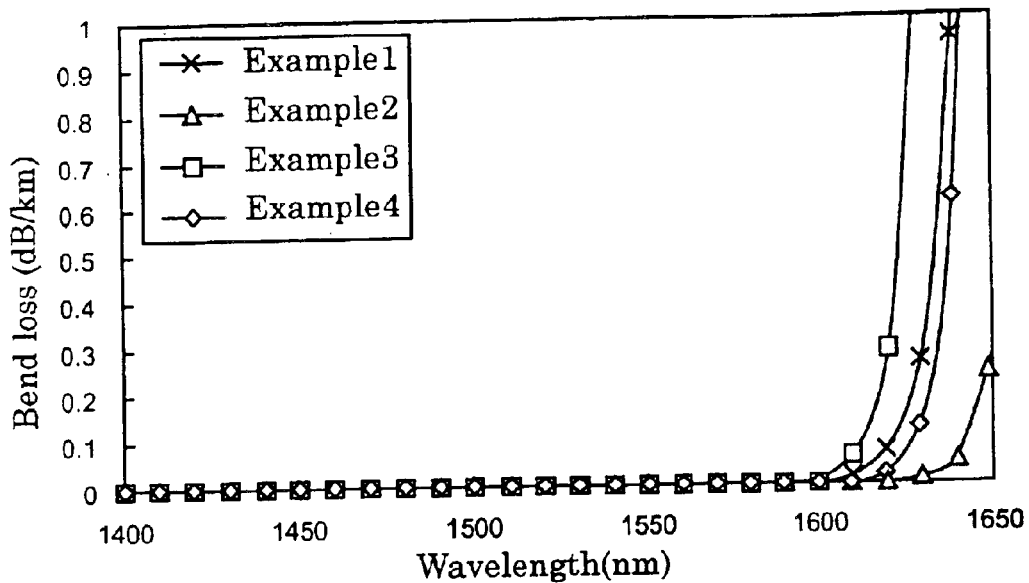
FIGS. 5A and 5B are graphs showing the relationship between the bend loss and the wavelength of the optical fibers of Examples 1 to 8 when they are coiled with a coiling diameter of 140 mm.
Figure 5B:
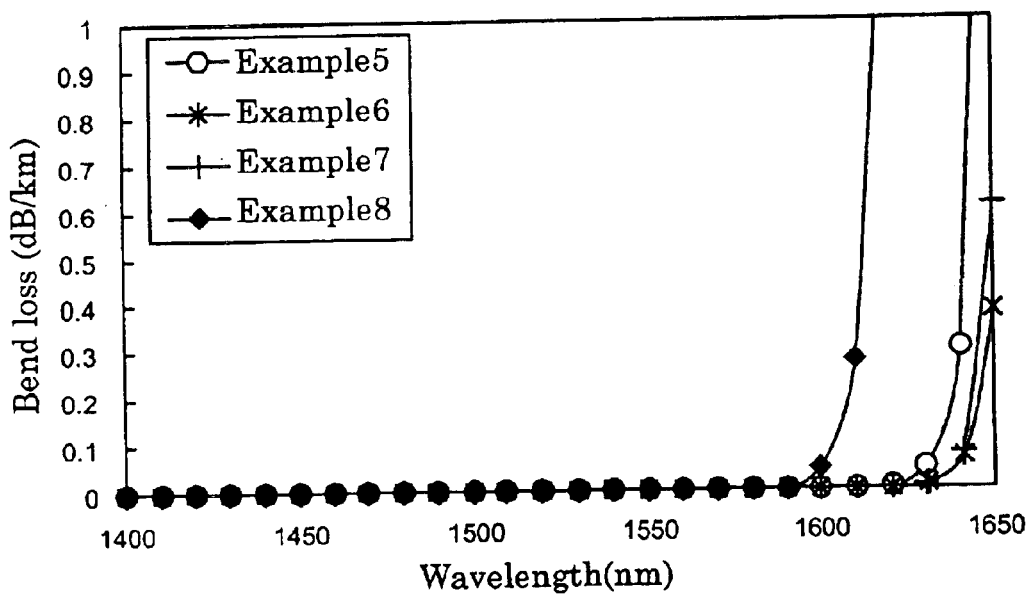

FIGS. 5A and 5B are graphs showing the relationship between the bend loss (increment in loss) and the wavelength of the optical fibers of Examples 1 to 8 when the optical fibers are coiled with a coiling diameter of 140 mm. As can be seen from FIGS. 5A and 5B, the optical fibers of Examples 1 to 7 have a low bend loss in a wavelength range of less than 1,610 nm. Therefore, they are suitable for use in the L-band (1,565 to 1,625 nm) even when they are coiled with a coiling diameter of 140 mm to form a module. On the other hand, in the optical fiber of Example 8, the bend loss increases abruptly when the wavelength increases beyond 1,590 nm. Therefore, this optical fiber is not suitable for use in the L-band when it is coiled to form a module. Nevertheless, this optical fiber can be used suitably when it is installed in a repeater span.

Figure 6A:
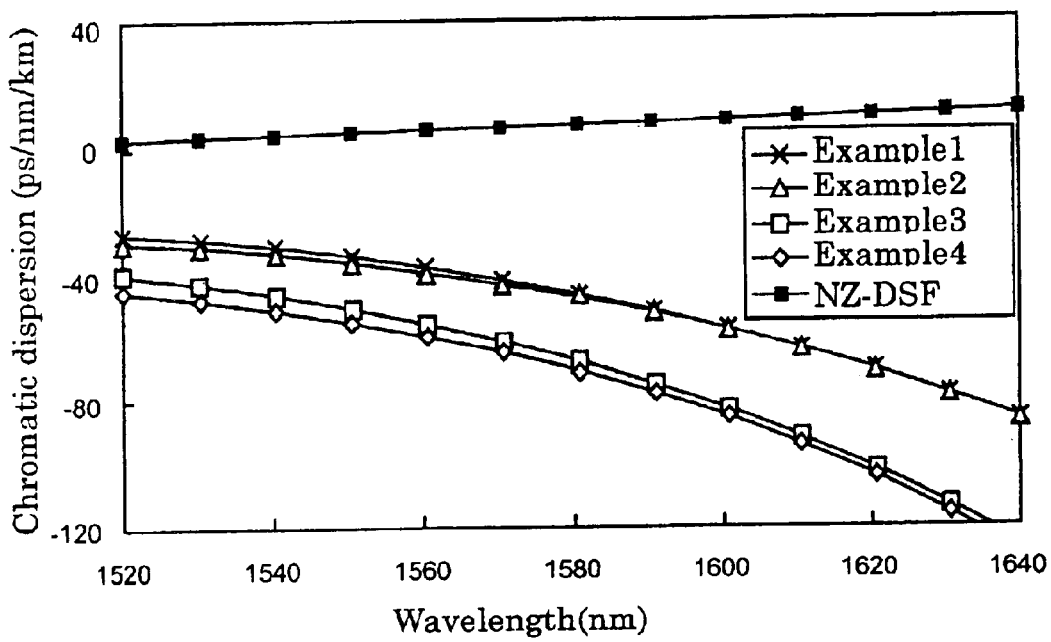
FIGS. 6A and 6B are graphs showing the relationship between the chromatic dispersion and the wavelength of the optical fibers of Examples 1 to 8.
Figure 6B:
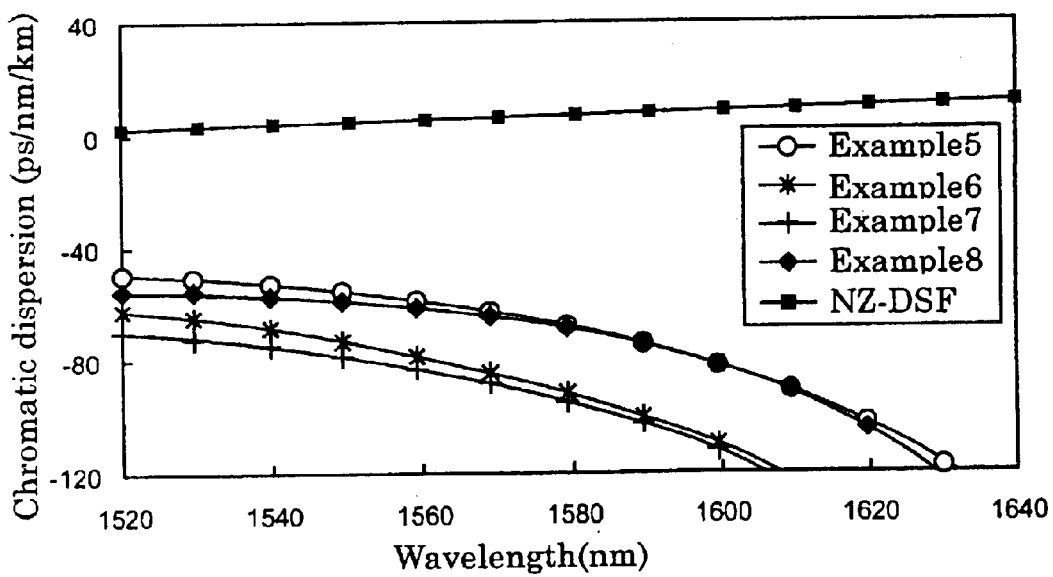

FIGS. 6A and 6B are graphs showing the relationship between the chromatic dispersion and the wavelength of the optical fibers of Examples 1 to 8. FIGS. 6A and 6B include an example of the chromatic dispersion-wavelength property of a non-zero dispersion-shifted fiber (NS-DSF) used as the optical fiber 11. As can be seen from FIGS. 6A and 6B, the NS-DSF used as the optical fiber 11 has a positive chromatic dispersion and a positive dispersion slope at a wavelength of 1,590 nm. On the other hand, the optical fibers of Examples 1 to 8 have a negative chromatic dispersion and a negative dispersion slope at a wavelength of 1,590 nm.

Figure 7A:
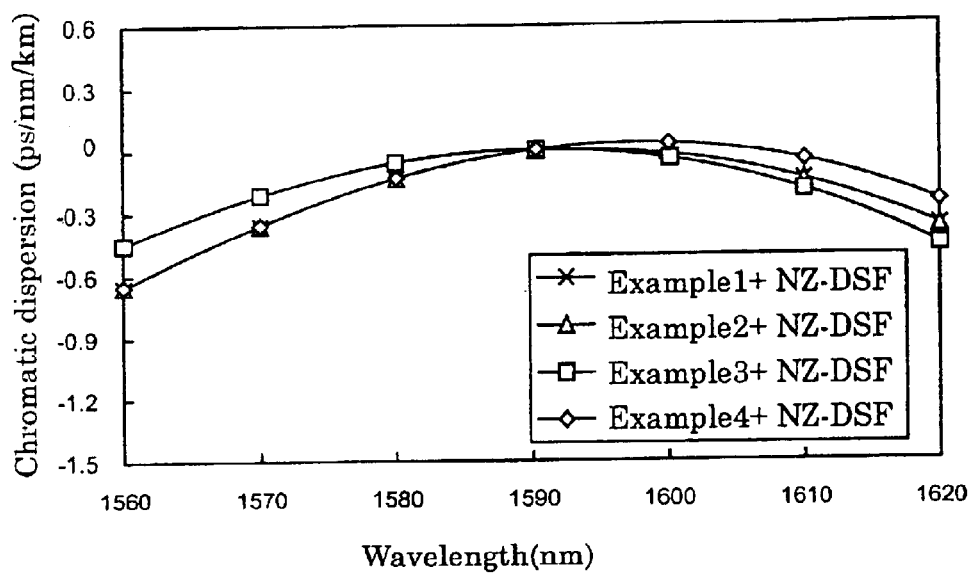
FIGS. 7A and 7B are graphs showing the relationship between the chromatic dispersion and the wavelength of the entire optical transmission lines incorporating the optical fibers of Examples 1 to 8.
Figure 7B:
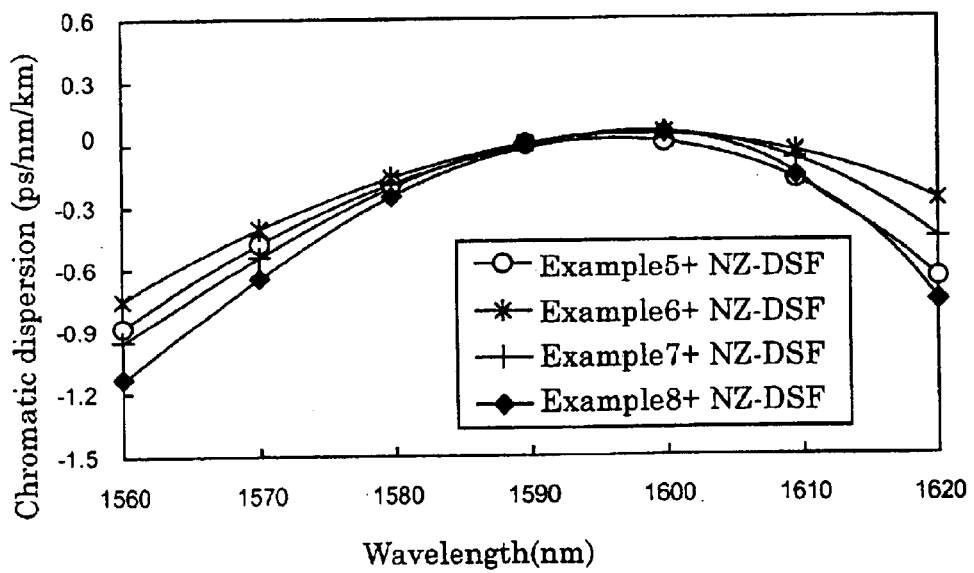

FIGS. 7A and 7B are graphs showing the chromatic dispersion-wavelength property of the entire optical transmission lines incorporating the optical fibers of Examples 1 to 8. In this case, the NS-DSF whose chromatic dispersion-

TABLE I

| Example | | 1 | 2 | 3 | 4 | 5 | 6 | 7 | 8 | 9 | 10 |
|---|---|---|---|---|---|---|---|---|---|---|---|
| $\Delta n_1$ | % | 1.20 | 1.40 | 1.40 | 1.60 | 2.00 | 2.00 | 2.40 | 2.00 | 2.20 | 2,20 |
| $\Delta n_2$ | % | −0.50 | −0.50 | −0.50 | −0.50 | −0.50 | −0.50 | −0.50 | −0.30 | −0.72 | −0.72 |
| $\Delta n_3$ | % | 0.50 | 0.50 | 0.50 | 0.50 | 0.50 | 0.50 | 0.50 | 0.50 | 0.30 | 0.30 |
| 2a/2c | | 0.33 | 0.30 | 0.30 | 0.28 | 0.22 | 0.24 | 0.20 | 0.16 | 0.22 | 0.21 |
| 2b/2c | | 0.80 | 0.80 | 0.80 | 0.80 | 0.81 | 0.79 | 0.80 | 0.86 | 0.58 | 0.59 |
| 2c | μm | 16.30 | 16.05 | 15.75 | 15.35 | 16.55 | 15.20 | 15.90 | 20.45 | 16.8 | 17.7 |
| $D_2$ | ps/nm/km | −51.151 | −51.504 | −74.456 | −77.262 | −73.307 | −100.906 | −102.787 | −73.835 | −178.748 | −132.512 |
| $S_2$ | ps/nm²/km | −0.5555 | −0.5242 | −0.8230 | −0.7844 | −0.7663 | −1.0091 | −1.0182 | −0.7427 | −2.210 | −1.938 |
| $S_2/D_2$ | /nm | 0.011 | 0.010 | 0.011 | 0.010 | 0.010 | 0.010 | 0.010 | 0.010 | 0.012 | 0.015 |
| $A_{eff}$ | μm² | 23.831 | 20.006 | 21.335 | 18.604 | 14.469 | 15.474 | 12.866 | 17.177 | 14.534 | 13.124 |
| Bend loss | dB/m | 15.768 | 7.316 | 17.987 | 10.541 | 3.813 | 5.724 | 2.898 | 7.515 | 1.984 | 1.099 |
| Loss | dB/km | 0.31 | 0.33 | 0.33 | 0.36 | 0.45 | 0.45 | 0.61 | 0.45 | 0.55 | 0.55 |
| 2-m cutoff wavelength | μm | 1.284 | 1.265 | 1.243 | 1.213 | 1.247 | 1.253 | 1.252 | 1.280 | 1.341 | 1.367 |

Figure 4A:
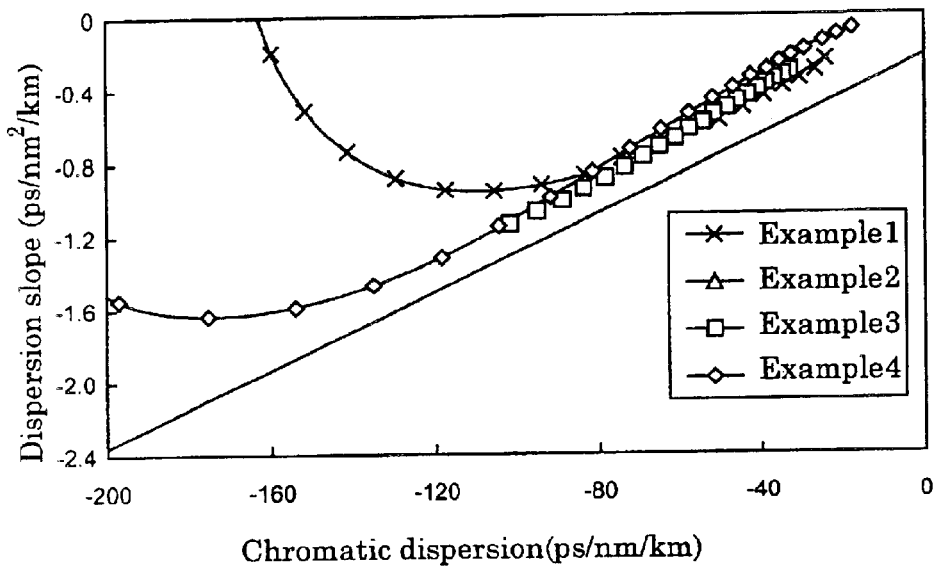
FIGS. 4A and 4B are graphs showing the relationship between the dispersion slope S and the chromatic dispersion D of the optical fibers of Examples 1 to 8 when the outer diameter 2c was varied.
Figure 4B:
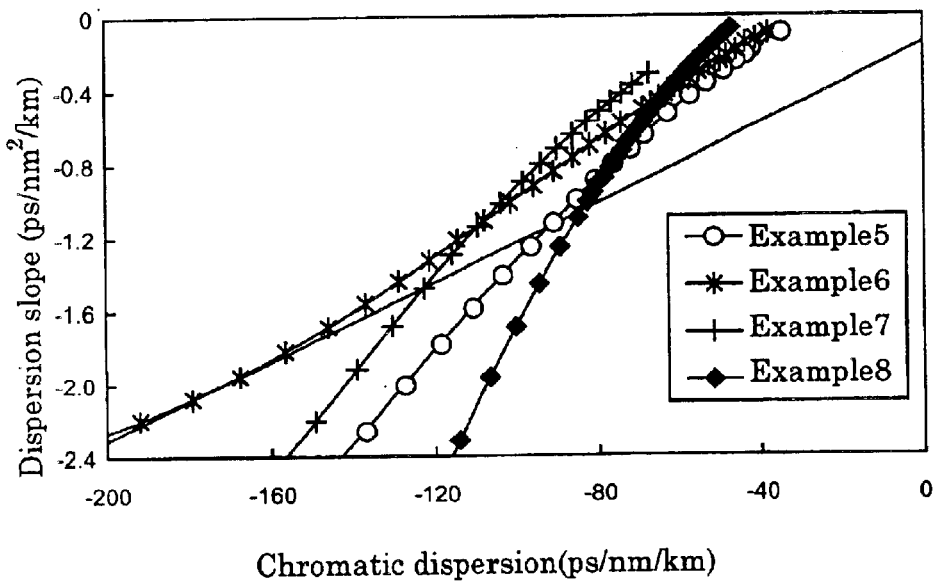

FIGS. 4A and 4B are graphs showing the relationship between the dispersion slope $S_2$ and the chromatic dispersion $D_2$ of the optical fibers of Examples 1 to 8 when the outer diameter 2c of the second cladding region 12c was varied. In this case, the outer diameter 2c was varied with the value shown in Table I positioned at the center of the variation. When the outer diameter 2c varied by 2%, the wavelength property is shown in FIGS. 6A and 6B is used as the optical fiber 11. The optical fibers of Examples 1 to 8 are used as the optical fiber 12. The optical fiber 12 is spliced with the optical fiber 11 having a length of 100 km. The lengths of the optical fibers of Examples 1 to 8 used as the optical fiber 12 are 15.03 km, 14,93 km, 10.33 km, 9.95 km, 10.49 km, 7.62 km, 7.48 km, and 10.41 km, respectively. As can be seen from FIGS. 7A and 7B, all the optical transmission lines have a small absolute value of chromatic dispersion in the L-band. In particular, in the optical transmission line incorporating the optical fiber of Example 1, the variation range of the average chromatic dispersion of the entire optical transmission line is not more than 0.4 ps/nm/km in a wavelength range of 1,570 to 1,610 nm.

When the optical fiber of Example 4 was coiled with a coiling diameter of 140 mm, its total loss was measured in a wavelength range of 1,565 to 1,610 nm. The maximum loss was 5.6 dB, and it occurred at a wavelength of 1,565 nm. The same measurement was conducted on the optical fiber of Example 5 under the same conditions as above. The maximum loss was 6.8 dB, and it occurred at a wavelength of 1,565 nm.

The present invention is described above in connection with what is presently considered to be the most practical and preferred embodiments. However, the invention is not limited to the disclosed embodiments, but on the contrary, is intended to cover various modifications and equivalent arrangements included within the spirit and scope of the appended claims.

The entire disclosure of Japanese patent application 2002-218449 filed on Jul. 26, 2002 including the specification, claims, drawing, and summary is incorporated herein by reference in its entirety.

What is claimed is:

1. An optical fiber having at a wavelength of 1,590 nm a chromatic dispersion, D, and a dispersion slope, S, that satisfy the formulae $-200 \text{ ps/nm/km} \leq D \leq -50 \text{ ps/nm/km}$, and $0.009/\text{nm} \leq S/D$.

2. An optical fiber as defined by claim 1, the optical fiber comprising:
   (a) a central core region including the center of optical axis and having a first refractive index;
   (b) a first cladding region encircling the central core region and having a second refractive index smaller than the first refractive index;
   (c) a second cladding region encircling the first cladding region and having a third refractive index larger than the second refractive index; and
   (d) a third cladding region encircling the second cladding region and having a fourth refractive index smaller than the third refractive index.

3. An optical fiber as defined by claim 2, wherein when the fourth refractive index is used as the reference:
   (a) the central core region has a relative refractive-index difference, $\Delta n_1$, of at least 1.2%; and
   (b) the first cladding region has a relative refractive-index difference, $\Delta n_2$, of at most −0.3%.

4. An optical fiber as defined by claim 2, wherein:
   (a) the central core region has a diameter of $2a$;
   (b) the second cladding region has an outer diameter of $2c$; and
   (c) the ratio $2a/2c$ is at least 0.20.

5. An optical fiber as defined by claim 2, wherein when the outer diameter of the second cladding region varies by 2%, the ratio S/D varies by at most 15%.

6. An optical fiber as defined by claim 1, the optical fiber having a transmission loss of at most 1.0 dB/km at a wavelength of 1,590 nm.

7. An optical fiber as defined by claim 1, the optical fiber having a total loss of at most 7 dB in a wavelength range of 1,565 to 1,610 nm.

8. An optical fiber as defined by claim 1, wherein the chromatic dispersion D and the dispersion slope S further satisfy the formula $S/D \leq 0.015/\text{nm}$.

9. An optical fiber as defined by claim 1, wherein the chromatic dispersion D and the dispersion slope S satisfy the formulae $-110 \text{ ps/nm/km} \leq D \leq -50 \text{ ps/nm/km}$, and $0.009/\text{nm} \leq S/D \leq 0.011/\text{nm}$.

10. An optical fiber as defined by claim 1, the optical fiber having an effective area of at least 12 $\mu\text{m}^2$ at a wavelength of 1,590 nm.

11. An optical fiber as defined by claim 1, the optical fiber having a cutoff wavelength of at least 1.2 $\mu\text{m}$.

12. An optical transmission line comprising:
   (a) a positive-dispersion optical fiber having at a wavelength of 1,590 nm a chromatic dispersion of +6 to +10 ps/nm/km and a dispersion slope of +0.07 to +0.10 ps/nm$^2$/km; and
   (b) an optical fiber that:
      (b1) has at a wavelength of 1,590 nm a chromatic dispersion, D, and a dispersion slope, S, that satisfy the formulae $-200 \text{ ps/nm/km} \leq D \leq -50 \text{ ps/nm/km}$, and $0.009/\text{nm} \leq S/D$; and (b2) is spliced with the positive-dispersion optical fiber.

13. An optical transmission line as defined by claim 12, wherein the variation range (difference between the maximum value and the minimum value) of the average chromatic dispersion of the entire optical transmission line is at most 0.4 ps/nm/km in a wavelength range of 1,570 to 1,610 nm.

14. An optical communications system comprising:
   (a) an optical transmitter for multiplexing a plurality of component signals having mutually different wavelengths to constitute a signal lightwave so that the signal lightwave can be outputted;
   (b) an optical transmission line comprising:
      (b1) a positive-dispersion optical fiber having at a wavelength of 1,590 nm a chromatic dispersion of +6 to +10 ps/nm/km and a dispersion slope of +0.07 to +0.10 ps/nm$^2$/km; and
      (b2) an optical fiber that:
         (b2a) has at a wavelength of 1,590 nm a chromatic dispersion, D, and a dispersion slope, S, that satisfy the formulae $-200 \text{ ps/nm/km} \leq D \leq -50 \text{ ps/nm/km}$, and $0.009/\text{nm} \leq S/D$; and (b2b) is spliced with the positive-dispersion optical fiber;

the optical transmission line transmitting the signal lightwave outputted from the optical transmitter; and
   (c) an optical receiver for receiving the signal lightwave having traveled over the optical transmission line.

* * * * *